Patented Aug. 23, 1932

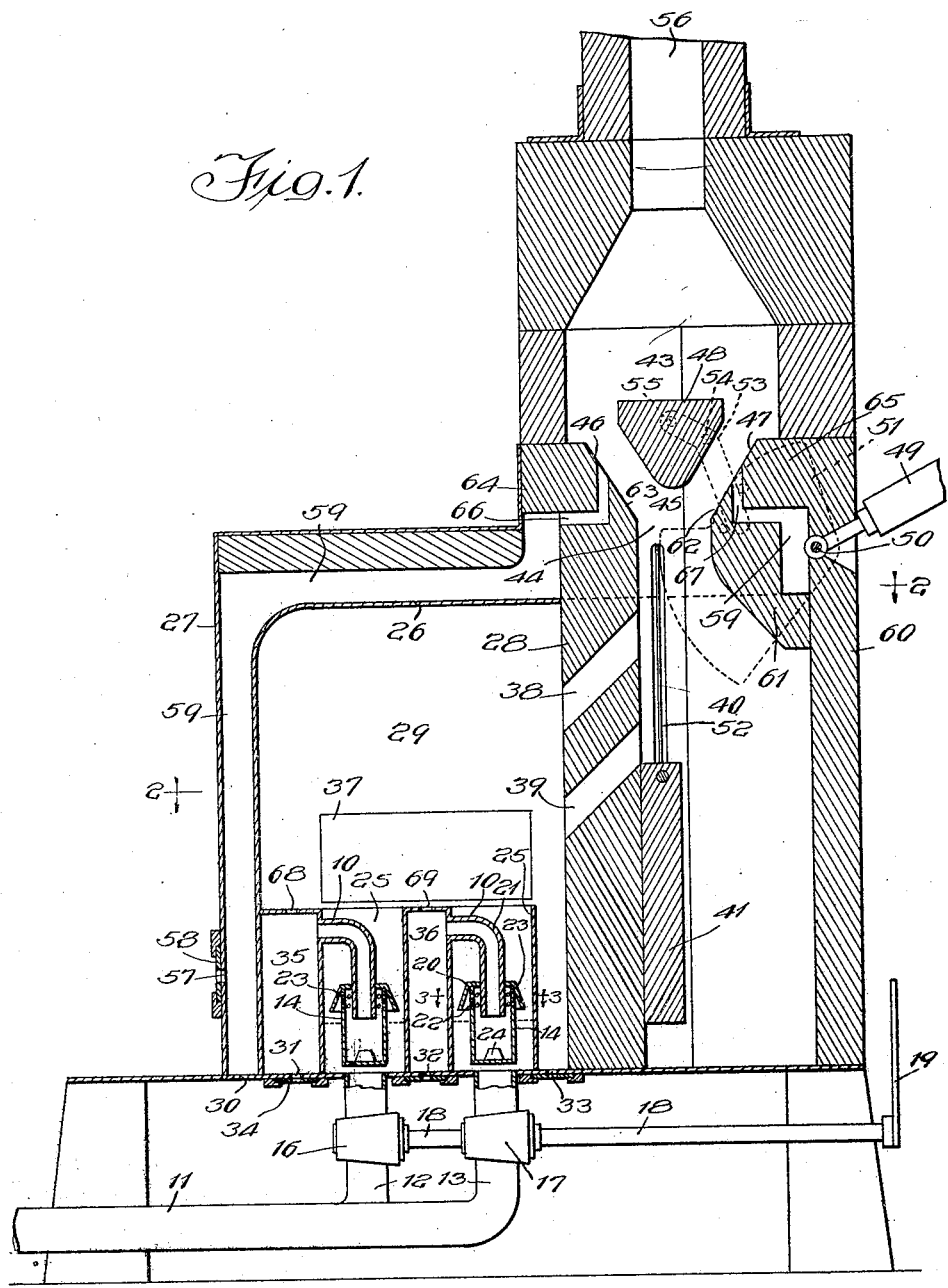

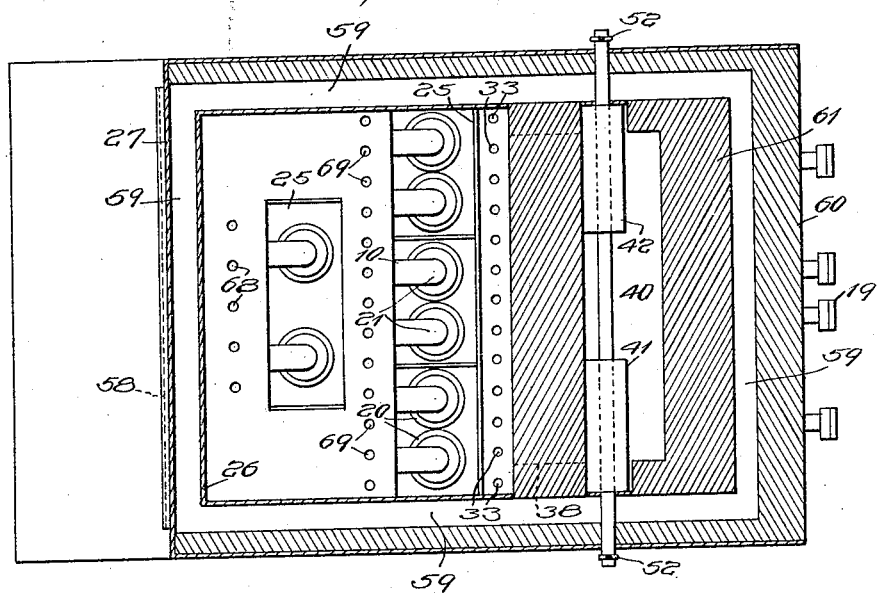
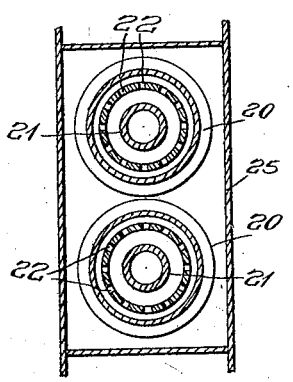
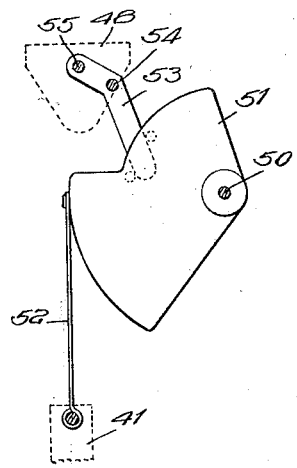

1,872,754

UNITED STATES PATENT OFFICE

JOHN A. KREUSER AND JOSEPH WILLERSCHEIDT, OF CHICAGO, ILLINOIS

GENERATOR AND HEATER

Application filed March 6, 1930. Serial No. 433,705.

The invention relates to a heater and primarily to a structure of this character which is capable of employing a liquid fuel such as oil from which gas is generated, and which when ignited, provides a heating medium for general heating purposes.

The invention has as one of its prime objects the provision of a catalytic agent which is located in a combustion chamber of the device, the catalytic agent being of some refractory material which, when heated, will assist in producing combustion.

Another object of the invention is to provide a chamber for the generator in which combustion takes place and to associate with this chamber a combustion chamber, the generator chamber and the combustion chamber being connected with each other through the agency of a mixer which will assist in mixing the gas emanating from the generator prior to its introduction to the combustion chamber.

It is a further object of the invention to provide a regulator for regulating the flow of the mixture through the mixer from the generator chamber to a combustion chamber and to also provide a movable catalytic agent which may be manipulated so as to control the rate of combustion.

Another object of the invention is the provision of a plurality of connected combustion chambers in which the fuel is successively subjected to combustion to thereby obtain the maximum amount of heat from a given amount of fuel.

It is another object of the invention to provide means whereby the catalytic agent and the control of governing the flow of the mixture from one combustion chamber to another are moved in synchronism with each other.

Another object of the invention is to arrange for the introduction of air to the generator and the combustion chambers so that proper generation and combustion will result.

The invention has these and other objects, all of which will be more readily understood when read in conjunction with the accompanying drawings forming a part hereof which illustrate one arrangement which may be resorted to, it being obvious that changes and modifications may be employed without departing from the spirit of the appended claims forming a part hereof.

In the drawings, Fig. 1 is a central vertical section of a generator and heater constructed according to one embodiment of the invention;

Fig. 2 is a section taken on line 2—2 of Fig. 1;

Fig. 3 is a section taken on line 3—3 of Fig. 1; and

Fig. 4 is a detail view showing a means for adjusting the catalytic element and controlling means for the mixer.

The structure illustrated contemplates the utilization of a generator 10 which is connected with a source of fuel supply through the agency of a pipe such as 11. This pipe 11 may have a plurality of branches such as 12 and 13 through which fuel is respectively fed to the several burners 14—14 of the generators generally designated 10. Each of the branches such as 12 and 13 is provided with a valve respectively designated 16 and 17 each of which has a stem 18 and a handle 19 to thereby provide means for regulating the flow of fuel to the burners 14 of the generators 10.

The generators 10 and the burners 14 thereof all being substantially similar in construction, an explanation of the structure of one will suffice for an understanding of all. The generators 10 each include a float 20 which is mounted for movement upon the air pipe 21. This pipe 21 communicates with atmosphere and one end of said pipe terminates within the float 20. The floats such as 20 are each provided with a plurality of apertures 22 and are also provided with an inverted cup-shaped element 23. The floats are further provided with a weight designated 24 which may be varied according to the specific gravity of the oil fed to the chambers 25 of the generators 10. When the specific gravity of the fuel to be employed is determined, each of the floats is provided with a weight 24 sufficient to maintain the edge of the inverted cup-shaped member 23 a prescribed distance from the level of the liquid contained in the chambers 25. It may be here stated that the generator generally designated 10 is encased in a housing 26 and that this housing 26 is, in turn, housed within an outer shell 27. One side of the housing 26 is closed by a wall 28 which provides a generator chamber 29 into which the ignited gases emanating from the generator generally designated 10 are discharged. The housing for the generator 10 includes a wall or floor 30 and this floor is provided with apertures 31, 32 and 33, each of which has associated therewith a shutter or damper 34 which is also provided with apertures so as to provide a means for regulating the amount of air passing through the apertures 31 to 33. The apertures 31 and 32 respectively, communicate with chambers 35 and 36, and therefore, air entering said apertures will pass through the respective chambers 35 and 36 and be discharged into the floats 20 of the burners 14. It is understood that heat is applied to the generators until a gas is generated from the oil contained in the chambers 25 and that as the gas is generated, this gas with the mixture of air furnished through the pipe 21 is discharged into the chamber 25 and from said chamber to the generator or combustion chamber 29. The chamber 29 is provided with a controlled opening 37 whereby access to the generators may be had to initially ignite the fuel to create the generation of gas. The wall 28 is provided with a plurality of upwardly inclined openings 38 and 39 which communicate with the generator chamber 29 and a combustion chamber 40.

These aperatures 38 and 39 provide mixing chambers for the gas passing from the combustion chamber 29 to the combustion chamber 40. Means is provided for regulating the passage of the mixture from the generator chamber to the combustion chamber. This means, in the present instance, contemplates the utilization of a pair of valves 41 and 42 which are slidably arranged relatively to the wall 28 and provide means for regulating the passage of the ignited gas through the openings 38 and 39. The combustion chamber 40 communicates with a combustion chamber 43 through the throat or opening 44, the latter of which terminates in a communication with a chamber 45 having the inclined side walls 46 and 47. A catalytic agent 48 is located in the chamber 45 in the path of the ignited gases passing from the combustion chamber 40 to the combustion chamber 43. This catalytic agent is composed of any suitable material which will withstand the heat resulting from combustion and may, therefore, be of any suitable heat refractory material.

Means is provided for moving the catalytic agent 48 relatively to the chamber 45 and the valves 41 and 42 in synchronism with each other so that the amount of mixture passing through the mixing chambers 38 and 39 and that which is subjected to the catalytic agent may be varied and regulated. The means herein shown for accomplishing this last mentioned feature includes a lever 49, one end of which is secured to a shaft 50, the shaft 50 having the opposite ends thereof provided with arcuate elements such as 51 which are located outside of the combustion chamber. Cables or chains 52 are connected to the respective arcuate elements 51 and said valves 41 and 42, and therefore, as the lever 49 is manipulated, the valves such as 41 and 42 will be moved with respect to the openings or mixing chambers 38 and 39. As before stated, means is provided for moving the catalytic agent 48 and the valve elements 41 and 42 in synchronism with each other. To accomplish this, the catalytic element is connected with the arcuate elements 51 through the agency of the pivoted arms 53 which are arranged at the opposite ends of said catalytic agent and pivoted at 54 and have one end thereof connected with the catalytic agent at 55. The opposite ends of the links 53 are connected with the arcuate elements 51 and therefore, as the arcuate elements are moved, this movement is transmitted to the catalytic agent 48 and will cause its movement with respect to the chamber 45 so as to move it toward and away from the chamber 45.

It is understood that the ignited gases contained in the combustion chamber 43 escape therefrom through a passage 56, from which it may be discharged into the fire box of a boiler or other similar device.

As before stated, the combustion chamber 29 is located within an outer shell forming a housing 27. This outer shell or housing 27 is provided with a plurality of openings 57 which are controlled through the agency of a damper 58. These apertures 57 communicate with the space 59 provided between the outer shell 27 and the housing 26 for the generator 10.

This space 59 preferably extends to the wall 60 and a wall 61 is formed which separates the combustion chamber 40 from the passage 59. The upper extremity such as 62 of this wall and the upper extremity such as 63 of the wall 28 is formed with a flange which, together with the wall sections 64 and 65, provide the inclined walls 46 and 47 of the chamber 45. The wall sections 64 and 65 and the adjacent portions of the walls 28 and 61 are maintained in separated relation relatively to each other to provide the openings 66 and 67 which form a communication between the air passage or space 59 and the chamber 45 and thus provide auxiliary means for feeding air to the ignited mixture introduced to the chamber 45.

The chambers 35 and 36 are each provided with a series of apertures 68 and 69 which, together with the apertures 33 provided in the floor 30, provide means for introducing atmosphere to the generator chamber. Since the apertures 31, 32 and 33 are each controlled through the agency of dampers, it is evident that the amount of air introduced to the generator chamber and to the generator per se may be varied and regulated to best suit the needs of any particular installation. It will be noted that the air port 33 is located directly below the opening or mixer 39 and therefore, combustion of a certain high degree occurs at said opening.

From the foregoing description of the invention, it is manifest that the structure provides a means whereby gas is generated from a liquid fuel fed to the generator which is discharged from the generator in a gaseous state to the combustion chamber 29 where certain combustion takes place and from which chamber, the ignited mixture is passed through openings which assist in turbulating and mixing the ignited fuel emanating from this chamber and cause it to be discharged in an upward direction against the wall 61 forming one wall of the combustion chamber 40 in which chamber further combustion of the fuel takes place. It is also evident that the structure provides for communication between the combustion chamber 40 and the combustion chamber 43 in which latter chamber the greatest combustion occurs and that a catalytic agent is arranged in the path of the ignited fuel passing from the combustion chamber 40 to the combustion chamber 43. It is evident that since this catalytic agent 48 is of a heat refractory material and that atmosphere is introduced to the ignited fuel as it engages the catalytic element, it is manifest that substantially complete combustion of the fuel takes place at the catalytic agent which results in combustion of a high order and increased heat.

Having thus described the invention, what we claim and desire to cover by Letters Patent is:

1. In a device of the kind described, the combination of a generator, a combustion chamber, a wall located between said generator and chamber, a mixer provided in said wall, said mixer opening into said combustion chamber, and a catalytic agent controlling the outlet of said combustion chamber.

2. In a device of the kind described, the combination of a generator, a plurality of communicating combustion chambers, the generator being located in one of said chambers, a mixer located between the chamber having said generator and one of said combustion chambers, controlling means for said mixer located in said last mentioned chamber, and a catalytic agent located in a combustion chamber, said last mentioned combustion chamber communicating with said chamber having the controlling means.

3. In a device of the kind described, the combination of a generator, a plurality of chambers, the generator being located in one of said chambers, a mixer located between the generator chamber and the other chamber, said chambers providing combustion chambers, controlling means for said mixer, and a catalytic agent located in the outlet of said last mentioned combustion chamber, said catalytic agent and controlling means being movable in synchronism to regulate combustion.

4. In a device of the kind described, the combination of a generator, a combustion chamber, a wall dividing the generator and combustion chamber, said wall having openings providing a mixer, said openings being inclined toward the upper portion of the combustion chamber, a chamber communicating with said combustion chamber, and a member providing a catalytic agent located in said second chamber.

5. In a device of the kind described, the combination of a generator, a combustion chamber, a wall dividing the generator and combustion chamber, said wall having openings providing a mixer, said openings being inclined toward the upper portion of the combustion chamber, a damper controlling said openings, a chamber communicating with said combustion chamber, and a member providing a catalytic agent located adjacent the outlet of said first mentioned combustion chamber.

6. In a device of the kind described, the combination of a generator, a combustion chamber, a wall dividing the generator and combustion chamber, said wall having openings providing a mixer, said openings being inclined toward the upper portion of the combustion chamber, a chamber with which said combustion chamber communicates, and a member providing a catalytic agent located adjacent the communication between said chambers, said member being movable relatively to said chambers and providing means for regulating combustion.

7. In a generator, the combination of a fuel receptacle, a float located in said receptacle, an air pipe, one end of said pipe being in communication with the atmosphere, the opposite end of said pipe being extended into said float, said float being apertured to provide means whereby air introduced through said pipe to said float may escape from said float into said fuel receptacle.

8. In a generator, the combination of a fuel receptacle, a float located in said receptacle, an air pipe, one end of said pipe being in communication with the atmosphere, the opposite end of said pipe being extended into said float, said float being apertured to provide means whereby air introduced through said pipe to said float may escape from said float into said fuel receptacle, said float having means whereby said air is directed toward said fuel in said receptacle.

9. In a device of the kind described, the combination of a generator chamber, a combustion chamber, a wall located between said generator chamber and combustion chamber, openings in said wall extending in the direction of the outlet of said combustion chamber, and a catalytic agent located in the outlet of said combustion chamber above said openings.

10. In a device of the kind described, the combination of a generator chamber, a combustion chamber, a wall located between said generator chamber and combustion chamber, openings in said wall extending in the direction of the outlet of said combustion chamber, and a catalytic agent located in the outlet of said combustion chamber, said catalytic agent being movable relatively to said outlet to regulate combustion.

11. In a device of the kind described, the combination of a generator chamber, a combustion chamber, a wall located between said generator chamber and combustion chamber, openings in said wall extending in the direction of the outlet of said combustion chamber, and a catalytic agent located in the outlet of said combustion chamber, and means for introducing air to the combustion chamber adjacent said agent.

12. In a device of the kind described, the combination of a generator chamber, a combustion chamber, a wall located between said generator chamber and combustion chamber, openings in said wall extending in the direction of the outlet of said combustion chamber, and a catalytic agent located in the outlet of said combustion chamber, said catalytic agent being movable relatively to said outlet to regulate combustion, and means for introducing air to the combustion chamber adjacent said agent.

13. In a device of the kind described, the combination of a generator, a combustion chamber, a wall located between said generator chamber and combustion chamber, openings in said wall extending in the direction of the outlet of said combustion chamber, and a catalytic agent located in the outlet of said combustion chamber, means for regulating said openings, said catalytic agent being movable relatively to said outlet to regulate the opening of said outlet.

In witness whereof, we hereunto subscribe our names this 1st day of March, A. D., 1930.

JOHN A. KREUSER.
JOSEPH WILLERSCHEIDT.